US008824753B2

(12) United States Patent
Souza et al.

(10) Patent No.: US 8,824,753 B2
(45) Date of Patent: Sep. 2, 2014

(54) TASK ORIENTED NOISE SUPPRESSION IN MEDICAL IMAGES

(75) Inventors: Andre Souza, Webster, NY (US); Krishnamoorthy Subramanyan, Palatine, IL (US)

(73) Assignee: Carestream Health, Inc., Rochester, NY (US)

( * ) Notice: Subject to any disclaimer, the term of this patent is extended or adjusted under 35 U.S.C. 154(b) by 277 days.

(21) Appl. No.: 13/267,017

(22) Filed: Oct. 6, 2011

(65) Prior Publication Data
US 2013/0089246 A1     Apr. 11, 2013

(51) Int. Cl.
*G06K 9/00* (2006.01)
*G06T 5/00* (2006.01)
*G06T 5/20* (2006.01)

(52) U.S. Cl.
CPC . *G06T 5/20* (2013.01); *G06T 5/002* (2013.01); *G06T 2207/10028* (2013.01); *G06T 2207/10081* (2013.01)
USPC ........................................................ 382/128

(58) Field of Classification Search
CPC ........... G06K 9/40; G06T 5/001; G06T 5/002
USPC ........................................................ 382/128
See application file for complete search history.

(56) References Cited

U.S. PATENT DOCUMENTS

| 5,170,439 | A | 12/1992 | Zeng et al. |
| 5,999,587 | A | 12/1999 | Ning et al. |
| 6,885,762 | B2 | 4/2005 | Saha et al. |
| 7,660,481 | B2 * | 2/2010 | Schaap et al. ................. 382/266 |
| 8,582,916 | B2 * | 11/2013 | Bar-Aviv et al. ............. 382/275 |
| 2006/0056724 | A1 * | 3/2006 | Le Dinh et al. .............. 382/274 |

OTHER PUBLICATIONS

Pietro Perona et al., "Scale-space and edge detection using anisotropic diffusion", *IEEE Transactions on Pattern Analysis and Machine Intelligence*, 1990, vol. 12, No. 7, pp. 629-639, Jul. 1889.
Ilya Pollack et al., "Image Segmentation and Edge Enhancement with Stabilized Inverse Diffusion Eguations", IEEE Transactions on Image Processing, vol. 9, No. 2, Feb. 2000, pp. 256-266.
Pollak, "Segmentation and Restoration via Nonlinear Multiscale Filtering" IEEE Signal Processing Magazine, Sep. 2002, pp. 26-36.
Andre Souza, "Noise-resistant adaptive scale using stabilized diffusion", Proc. SPIE 7962, 79624W Aug. 2011, Medical Imaging 2011, Image Processing, 11 pages.
A. Madabhushi et al., entitled "Generalized scale: theory, algorithms, properties and application to image inhomogeneity correction," Comput. Vis. Image Und. 101, pp. 100-121 (2006).

* cited by examiner

*Primary Examiner* — Tom Y Lu

(57) ABSTRACT

A method for noise suppression in a 3-D volume image, executed at least in part on a logic processor, obtains the 3-D volume image, applies diffusion to the volume image according to a parameter that relates to image scale and is specified in an operator instruction, and displays the volume image modified according to the applied diffusion.

19 Claims, 12 Drawing Sheets

TASK ORIENTED NOISE SUPPRESSION IN MEDICAL IMAGES

FIELD OF THE INVENTION

The invention relates generally to the field of medical imaging and more particularly relates to a method for application-dependent noise suppression for volume images.

BACKGROUND OF THE INVENTION

Noise is often present in acquired medical images, such as those obtained from computed tomography (CT) scanning and other x-ray systems, and can be a factor in determining how well intensity interfaces and fine details are preserved in the image. Noise also affects automated image processing and analysis tasks in medical and dental imaging applications.

Methods for improving signal-to-noise ratio (SNR) and contrast-to-noise ratio (CNR) can be broadly divided into two categories: those based on image acquisition techniques and those based on post-acquisition image processing. Improving image acquisition techniques beyond a certain point can introduce other problems and generally requires increasing the overall acquisition time. This risks delivering a higher X-ray dose to the patient and loss of spatial resolution and may require the expense of scanner equipment upgrade.

Post-acquisition filtering, an off-line image processing approach, is often as effective as improving image acquisition without affecting spatial resolution. If properly designed, post-acquisition filtering requires less time and is usually less expensive than attempts to improve image acquisition. Filtering techniques can be classified into two groupings: (i) enhancement, wherein the desired structure information is enhanced, ideally without affecting unwanted (noise) information, and (ii) suppression, wherein unwanted noise information is suppressed, ideally without affecting the desired information. Suppressive filtering operations may be further divided into two classes: a) space-invariant filtering, and b) space-variant filtering.

Space-invariant filtering techniques, wherein spatially independent fixed smoothing operations are carried out over the entire image, can be effective in reducing noise, but often blur key structures or features within the image at the same time. This can be especially troublesome because details of particular interest often lie along an edge or a boundary of a structure within the image, which can be blurred by conventional smoothing operations.

Space-variant filtering techniques, meanwhile, are less likely to cause blurring of the image. Various methods using space-variant filtering, wherein the smoothing operation is modified by local image features, have been proposed. Diffusive filtering methods based on Perona and Malik's work (1990) Perona and Malik, "Scale-space and edge detection using anisotropic diffusion", *IEEE Trans. Pattern Analysis. Machine Intelligence,* 1990, Vol. 12, pp. 629-639 have been adapted to a number of image filtering applications. Using these methods, image intensity at a pixel is diffused to neighboring pixels in an iterative manner, with the diffusion conductance controlled by a constant intensity gradient for the full image. The approach described by Perona and Malik uses techniques that preserve well-defined edges, but apply conventional diffusion to suppress noise in other, more uniform areas of the 2-D image. While such an approach exhibits some success with 2-D images, however, there are drawbacks. One shortcoming of this type of solution relates to the lack of image-dependent guidance for selecting a suitable gradient magnitude. Since morphological or structural information is not used to locally control the extent of diffusion in different regions, fine structures often disappear and boundaries that are initially somewhat fuzzy may be further blurred upon filtering when this technique is used.

Three-dimensional imaging introduces further complexity to the problem of noise suppression. For example, conventional computed tomography CT scanners direct a fan-shaped X-ray beam through the patient or other subject and toward a one-dimensional detector, reconstructing a succession of single slices to obtain a volume or 3-D image.

In cone-beam computed tomography (CBCT) scanning, a 3-D image is reconstructed from numerous individual scan projections, each taken at a different angle, whose image data is aligned and processed in order to generate and present data as a collection of volume pixels or voxels. CBCT scanning is of interest for providing 3-D imaging capabilities. However, image noise remains a problem.

The processing of CBCT data for obtaining images requires some type of reconstruction algorithm. Various types of image reconstruction have been proposed, generally classified as either (i) exact, (ii) approximate, or (iii) iterative. Exact cone-beam reconstruction algorithms, based on theoretical work of a number of researchers, require that the following sufficient condition be satisfied: "on every plane that intersects the imaged object there exists at least one cone-beam source", also called the sufficient condition, to be satisfied. The widely used Grangeat algorithm, familiar to those skilled in CBCT image processing, is limited to circular scanning trajectory and spherical objects. Only recently, with generalization of the Grangeat formula, is exact reconstruction possible in spiral/helical trajectory with longitudinally truncated data.

Despite advances in exact methods (i, above), approximate methods (ii) continue to be more widely used. Among these CBCT reconstruction approaches are the Feldkamp (FDK) based algorithms, which advantages include:

1) FDK based algorithms may produce better spatial and contrast resolution, since they need less regularization than do the exact reconstructions.

2) FDK processing produces improved temporal resolution. Reconstruction can be performed using either full-scan or half-scan data. The shorter scanning time improves the temporal resolution, which is critical for applications such as cardiac imaging, lung imaging, CT-guided medical intervention, and orthopaedics.

3) FDK algorithms are computationally efficient. Implementation of the FDK algorithm is relatively straightforward, and processing can be executed in parallel.

The increasing capabilities of high-performance computers and advanced parallel programming techniques contribute to making iterative CBCT reconstruction algorithms (iii, as listed previously) more attractive. As one advantage, iterative approaches appear to have improved capabilities in handling noisy and truncated data. For instance, iterative deblurring via expectation minimization, combined with algebraic reconstruction technique (ART), has been shown to be effective in suppressing noise and metal artifacts.

Image variation is inherent to the physics of image capture and is at least somewhat a result of practical design tolerances. The discrete nature of the x-ray exposure and its conversion to a detected signal invariably results in quantum noise fluctuations. This type of image noise is usually described as a stochastic noise source, whose amplitude varies as a function of exposure signal level within a projected digital image. The resulting relative noise levels, and signal-to-noise ratio (SNR), are inversely proportional to exposure.

A second source of image noise is the flat-panel detector and signal readout circuits. In many cases, image noise that is ascribed to non-ideal image capture is modeled as the addition of a random component whose amplitude is independent of the signal level. In practice, however, several external factors, such electro-magnetic interference, can influence both the magnitude and the spatial correlations of image noise due to the detector.

Noise is an inherent aspect of cone beam projection data, especially for low-dose scans. Filtering methods to compensate for noise in 2-D projection data (or sinograms) have been reported in the literature. However, as compared against 2-D considerations, the 3-D noise problem is significantly more complex and does not readily lend itself to 2-D solutions.

An overall goal of noise filtering is to preserve structural information that is of interest while suppressing unwanted noise. Among challenges with conventional noise filtering is the need to apply a filter that is appropriate for the level of detail that is needed for a particular application. This difficulty relates to the problem of scale in image processing and, for medical images in particular, the need to adapt image processing techniques to a spatially varying level of detail.

Local scale models have been generally limited to fixed-size, shape, and image anisotropy, and have been focused on specific applications and imaging types, without adaptation for variable image content itself. Locally adaptive scale models are known in the imaging arts and have been applied in fields such as MRI (Magnetic Resonance Imaging) and other volume imaging applications. As one example, locally adaptive scale modeling for MRI volume images is described in U.S. Pat. No. 6,885,762 entitled "Scale-based Image Filtering of Magnetic Resonance Data" to Saha et al. In addition, to help overcome shape, size, and anisotropic constraints imposed by earlier morphometric scale models, a semi-locally adaptive scale, known as s-scale, has been introduced. While such methods offer some measure of improvement for noise filtering, however, it is acknowledged that there is room for improvement.

Considerations of scale relate to how image content is used. Dentistry is one general area in which the same image, at different scale, can be of value to practitioners of different disciplines. The use of 3D imaging for treatment of teeth and related structures will vary from one dental specialty to the next. For an endodontist or a general dental practitioner, for example, improved low-contrast of soft-tissues may be preferred over fine details when investigating the presence of tumors and lesions. Alternately, fine details of trabeculae would be more valuable to periodontists and to oral and maxillofacial surgeons to estimate bone strength for implant placement. A better visualization of root morphology, including the low density band around roots, and of the pulp chamber would be of value for other procedures. Orthodontists may prefer an overall improved image sharpness and clearness for a better 3D volume rendering or segmentation of the teeth. The type of noise filtering in each case, corresponding to image scale, determines how effective the image is for its intended use.

Thus, it is seen that there is a need for improved noise suppression filtering methods that adaptively reduce image noise in volume images, such as those obtained from CBCT systems, without compromising sharpness and detail for significant structures or features in the image.

SUMMARY OF THE INVENTION

It is an object of the present invention to advance the art of noise suppression in image reconstruction from CBCT image data and other types of 3-D volume imaging technologies that use image reconstruction.

It is a feature of the present invention that filtering parameters can be selected and adjusted according to image content as well as to the requirements of the individual viewer.

It is an advantage of the present invention that it uses a noise-resistant stabilized diffusion filtering with semi-locally adaptive scale.

From one aspect, the present invention provides a method for noise suppression in a 3-D volume image, the method executed at least in part on a logic processor and comprising: obtaining the 3-D volume image; applying diffusion to the volume image according to a parameter that relates to image scale and is specified in an operator instruction; and displaying the volume image modified according to the applied diffusion.

From another aspect, the present invention provides a method for processing a 3-D medical image, the method executed at least in part on a logic processor and comprising: obtaining the 3-D medical image; processing the obtained 3-D image by applying a stabilized diffusion process using a succession of different scale values and merging results obtained using the different scale values; and displaying the processed 3-D image at one or more of the succession of scale values.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. Elements of the drawings are not necessarily to scale relative to each other.

DETAILED DESCRIPTION OF THE INVENTION

Figure 1:
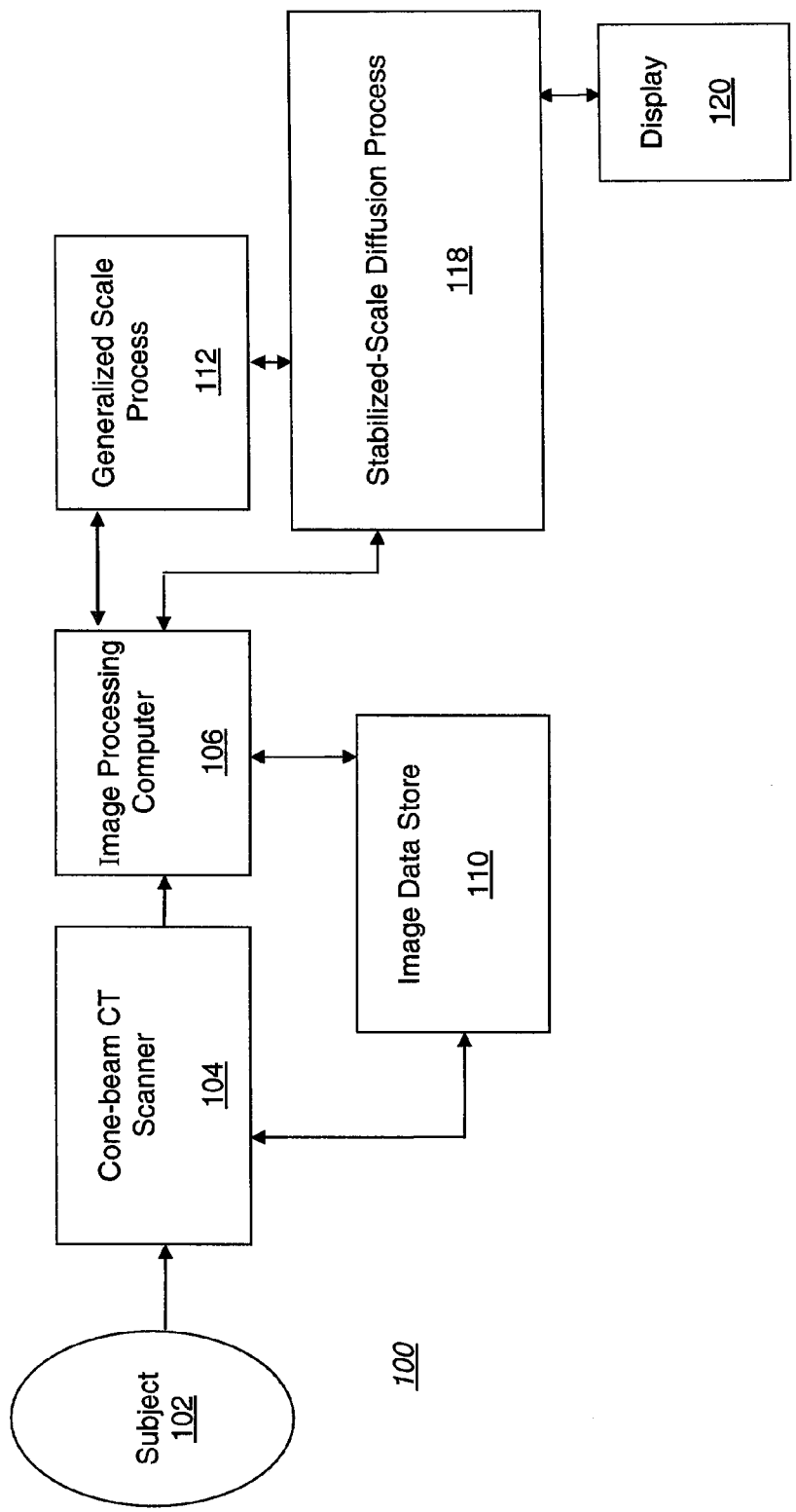
FIG. 1 is a block diagram that shows an image acquisition and processing system according to an embodiment of the present invention.

The following is a detailed description of the preferred embodiments of the invention, reference being made to the figures in which the same reference numerals identify the same elements of structure in each of the figures.

The term "image element" or "digital image element" refers to a pixel (from "picture element" and commonly used for an image with two dimensions) or to a voxel (from "volume picture element" for an image of three or more dimensions).

The term "semi-locally adaptive scale" is used in the present application to describe an area of a 2-D image or, correspondingly, a volume of a 3-D or 4-D or higher image that contains a grouping of contiguous image elements (that is, pixels in the 2-D domain; voxels in 3-D, 4-D, or higher-dimensioned images). A semi-locally adaptive scale that imposes no size, shape, or anisotropic constraints, is defined by intensity characteristics of its image elements (pixels or voxels), such as where their intensity values lie within a certain range of values, for example, as well as where a grouping of pixels is bounded by discernable bounding structures or features in the image.

The term "adjacent", or "n-adjacent" where n is an integer, when used to describe an image element, pixel or voxel, indicates that two image elements are in some way contiguous. For a two-dimensional image, one pixel may be adjacent to another either at one of its 4 vertices or along any of its 4 edges. For a three-dimensional image, one voxel may be adjacent to another either at any of its 8 vertices, or along any of its 12 edges, or along any of its 6 faces (to its so-called "6-adjacent" voxels). A voxel is thus adjacent to as many as 26 neighboring voxels.

FIG. 1 shows components of an image acquisition and processing system 100 for executing the method of the present invention for 3-D imaging in one embodiment. Image acquisition and processing system 100 includes an imaging apparatus 104, shown in the embodiment of FIG. 1 as a cone-beam CT scanner, CBCT scanner. The method of the present invention could alternately be used with other types of imaging systems, including 4-D, or other systems. In the FIG. 1 embodiment, the CBCT scanner images a subject 102, such as a patient, capturing image data to produce a volume of image data as a sequence of individual image slices. The entire set of image slices provides volume image data for the subject. The number of slices taken from one direction may vary from a few dozen to hundreds of image slices, limited by the current CT scanner resolution. The image slices thus obtained are conventionally stored in and can be obtained from an image data store or storage system 110 as a DICOM series, as reported in National Electrical Manufacturers Association (NEMA) ed.: Digital Imaging and Communications in Medicine (DICOM) Part 3, PS 3.3 (2003). DICOM is a standard for image representation and storage well-known to those skilled in the medical imaging arts. These DICOM series elements can be referred to as pre-processed image data.

Post-processing of image data can take any of a number of forms. In one embodiment, an image processing computer 106 uses the DICOM series stored in image data store 110 to produce filtered (noise-suppressed) image slices. In an embodiment using the components of FIG. 1, image processing computer 106 invokes a generalized scale (also termed "g-scale") process 112 and stabilized-scale diffusion process 118 that includes stored instructions arranged to provide noise-filtered image output, using an iterative sequence described in more detail subsequently. An optional display 120 then allows the processed image to be viewed.

Embodiments of the present invention provide an improved filtering method for image noise suppression for dental CBCT, as well as for fan beam, tomosynthesis, and other dental and medical imaging applications.

An acquired digital 3-D image scene is represented as a pair C=(C,f), wherein:

$$C = \{c \mid -b_j \leq c_j \leq b_j \text{ for some } b_j \in Z_+^3\}$$

wherein $Z_+^3$ is the set of 3-tuples of positive integers called voxels, f is a function whose domain, termed the scene domain, is C. The range of f is a set of integers [L,H] and for any $c \in f(c)$, $f(c)$ is referred to as the intensity of c. whose values are the measurements of the projection data $P_\beta(u,v)$ such that there exists a one-to-one mapping from c to $(u, v, \beta)$. Domain C corresponds to a binary scene if the range of f is $\{0,1\}$. For any set X, we use the notation |X| to denote its cardinality (number of elements in the set).

The g-scale model has been developed for providing some measure of adaptation to detailed information in the volume image and for scale preferences of the viewer in filtering the image using anisotropic diffusion. For applying diffusion filtering that adapts locally, the g-scale model operates using an over-segmentation of the image, considered as superpixels or supervoxels. This over-segmentation partitions regions of the image, to provide diffusion filtering that is appropriate for local features. For objects within the image, one or more regions can contain the same object. Different objects can correspond to separate sets of regions.

Although useful in applications, g-scale models may not be able to handle noise effectively for some types of images because of their purely theoretical definition of local homogeneity. In this spirit, a mechanism for merging g-scale regions is preferred for increasing tolerance to noise. An improvement on the basic g-scale model, known as the s-scale model, applies a stabilized anisotropic diffusion filtering process to the partitioned image data.

FDK Reconstruction

To comprehend aspects of the present invention, it is instructive to review the basic procedure for 3-D image reconstruction that is used in conventional Feldkamp (FDK) reconstruction. Using the conventional circular scanning trajectory, the Feldkamp or FDK reconstruction algorithm has three basic steps:

(1) weighting $P_\beta(u,v)$;
(2) convolving the weighted projections with a filter kernel h; and
(3) backprojecting the filtered data from every angle $\beta$, according to the formula:

$$g(t, s, z) = \frac{1}{2} \int_0^{2\pi} \frac{D_{so}^2}{(D_{so} - s)^2} \int_{-\infty}^{\infty} P_\beta(u, v) * h\left(\frac{D_{so} t}{D_{so} - s} - u\right) * \frac{D_{so}}{\sqrt{D_{so}^2 + v^2 + u^2}} du d\beta, \quad (1)$$

wherein $D_{so}$ is the distance from the source to the origin of the object coordinate system. The (u,v) coordinate system of the detector is given by the following transformations:

$$u = \frac{D_{so} t}{D_{so} - s} \quad (2)$$

$$v = \frac{D_{so} z}{D_{so} - s} \quad (3)$$

In the Cartesian coordinate system (x, y, z), the rotated coordinate system (t, s, z) is expressed by:

$$t = x \cos \beta + y \sin \beta \quad (4)$$

$$s = -x \sin \beta + y \cos \beta \quad (5)$$

FDK reconstruction has been shown to be a tool for combining the image data from images taken about a circular trajectory of the subject. However, this technique suffers from noise content, a problem that has not been satisfactorily corrected using existing filtering or other noise-compensation techniques. The method of the present invention supports FDK reconstruction by supplying a set of filtered projections with suppressed noise content.

Stabilized Scale Diffusion

In order to better understand how diffusive filtering of the present invention operates, it is instructive to contrast it with other diffusion filtering methods used for image processing. As described in the 2-D noise suppression filtering work of Perona and Malik, cited earlier, anisotropic diffusion is a locally adaptive smoothing process that attempts to minimize blurring near object boundaries. A mathematical formulation in a continuous domain, known to those familiar with Gauss's theorem from vector calculus, expresses the diffusion process on a vector field V at a point c in coordinate-free form by:

$$\frac{\partial f}{\partial t} = div V = \lim_{\Delta t \to 0} \int_s V ds \quad (6)$$

wherein $\Delta t$ is the volume that is enclosed by the surface s that surrounds a given point c and ds=u ds, where u is a unit vector that is orthogonal and outward-directed with respect to the infinitesimal surface element ds. The intensity flow vector field V controls the diffusion process and is defined as:

$$V = GF \quad (7)$$

where G is the diffusion conductance function, and F is the scene intensity gradient vector field. In a conventional linear isotropic diffusion process, G is a constant. In the Perona and Malik article noted earlier, the authors indicate that such isotropic diffusion strategies tend to blur object boundaries and structures. Thus, the noise suppression method proposed by Perona and Malik is an alternative anisotropic diffusion method in which G varies at each location in the scene as a nonlinear function of the magnitude of the scene intensity gradient so that smoothing within a region with low intensity gradients is encouraged, and smoothing across boundaries, wherein the magnitude of the gradients is much higher, is discouraged. Embodiments of the present invention carry out stabilized diffusion filtering as an iterative method. For the description of this method that follows, variable k denotes the iteration number. Then $C_{(k)} = (C, f_{(k)})$ denotes the scene resulting from the kth iteration of diffusion processing.

Figure 2:
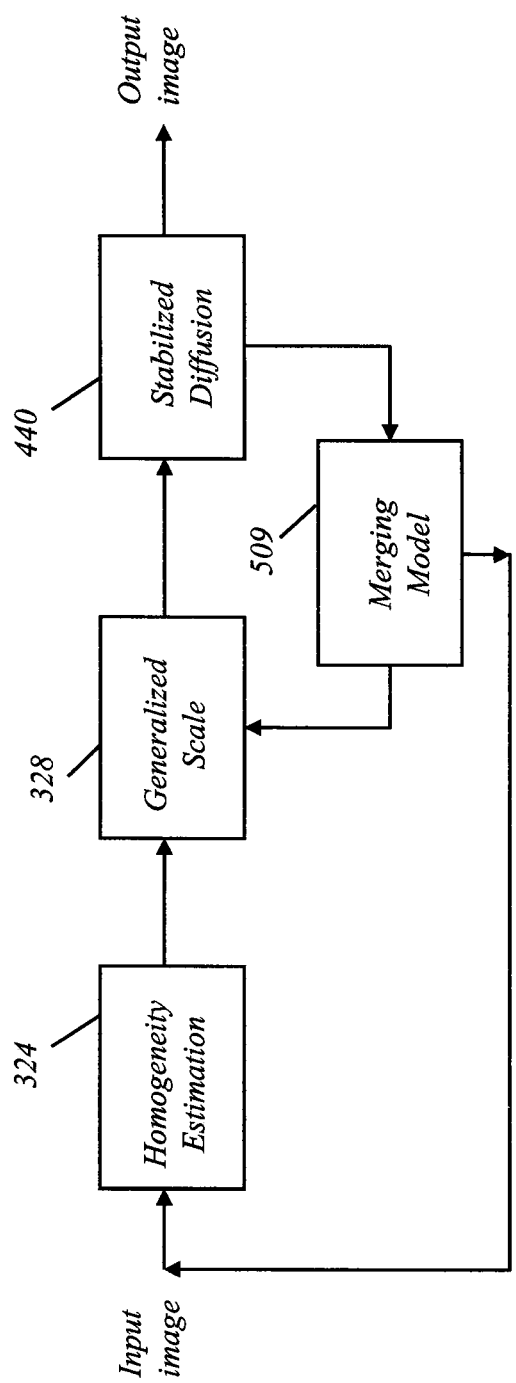
FIG. 2 is a logic flow diagram showing image processing using stabilized-scale diffusion filtering.

The flow diagram of FIG. 2 shows the sequence of processes that are applied for noise suppression when using s-scale diffusive filtering according to an embodiment of the present invention. In a homogeneity estimation step 324, appropriate diffusion parameters for each region of an obtained input image are computed. Estimation step 324 computes parameters using statistical values that relate to intensity differences in the image data within the local region. This includes computing or otherwise obtaining a homogeneity value, $\sigma_\psi$ for the 3-D data set for the complete image. A g-scale process is executed to define local scales G(d), for all voxels d in the volume image in a generalized scale step 328. A stabilized diffusion step 440 then applies the diffusion parameters that have been computed to the 3-D data set. This is an iterative process, repeating one or more times in order to provide improved noise suppression. In subsequent processing, the filtered image from the previous iteration is further filtered. Consistent with an embodiment of the present invention, a merging model step 509 is introduced. Basically, in the evolution of the diffusive model (in diffusion step 440), this sequence introduces a behavior state to drive neighboring voxel intensities to larger and larger iso-intensity regions as part of the merging operation. In effect, this drives the diffusion process to a coarser and coarser piecewise-constant approximation of the original scene. After a suitable number of iterations of merging model step 509, generalized scale step 328, and stabilized diffusion step 440, the output image is displayed or can be further processed. Optionally, the output image can be displayed during processing.

Figure 3:
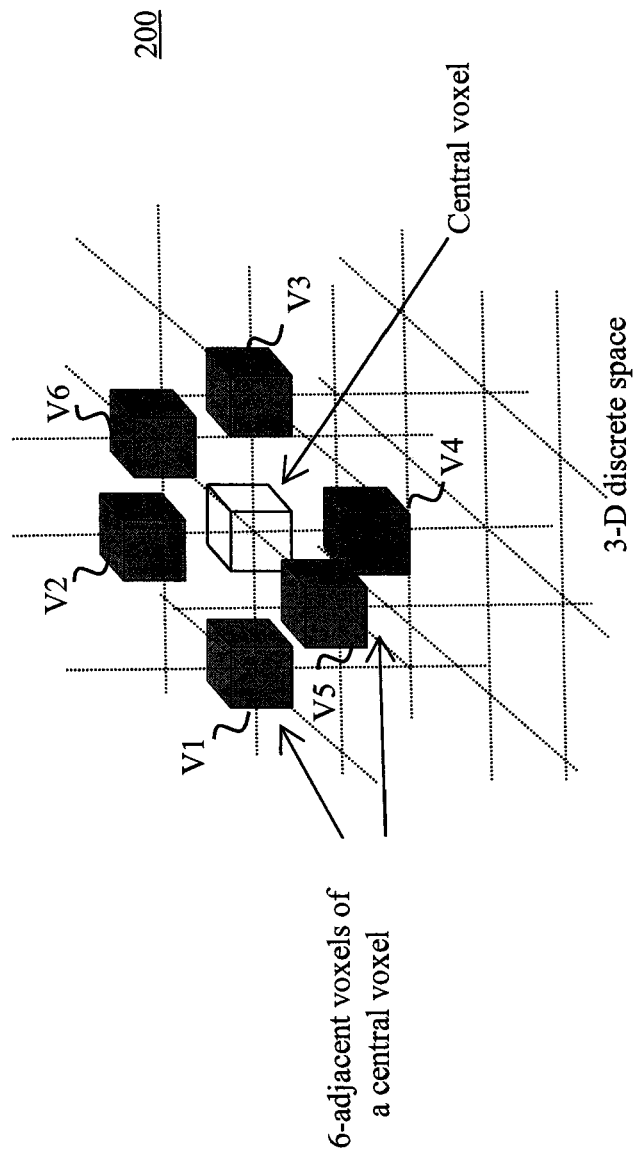
FIG. 3 is a perspective view showing some of the voxels adjacent to a central voxel in a 3-D image.

This sequential strategy for a merging model applies a control theory behavior known as sliding modes. Strictly speaking, for any 6-adjacent voxels d, e∈C, if $f_{to}(d) = f_{to}(e)$ at some $t_o$th iteration, then $f_t(d) = f_t(e)$ at any tth iteration such that $t > t_o$. As a result, as soon as the values of two neighboring samples equal each other, they stay equal during subsequent diffusion processing. This processing uses the 6-adjacent voxel neighborhood in 3-D discrete space. The 6-adjacent voxels have surface adjacency, as described earlier. FIG. 3 illustrates an exemplary 3-D representation 200 for a 6-adjacent voxel V1-V6 neighborhood for a central voxel.

Figure 4A:
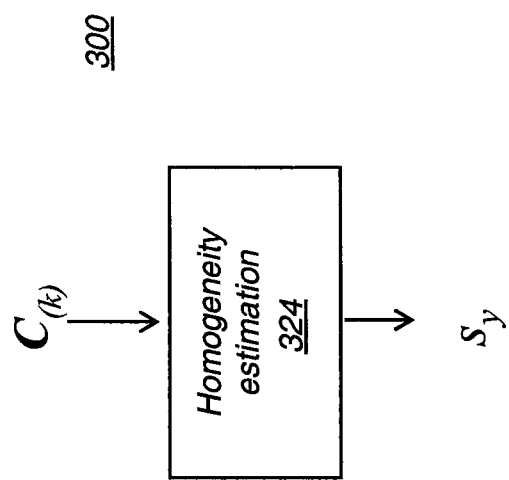
FIG. 4A is a logic flow diagram showing generalized scale processing according to one embodiment of the present invention.

FIG. 4A shows processing logic for a homogeneity value $\sigma_\psi$ estimation process 300 that is automatically estimated from a given input scene $C_{(k)}$. In a homogeneity estimation step 324, mean •, and standard deviation σ, of the magnitude of intensity differences, |f(c)−f(d)|, for all possible pairs of voxels c, d in C are computed. Note that the 10th upper percentile of differences are discarded in order to account for inter-object boundaries. The homogeneity $\sigma_\psi$ is, therefore, expressed by $\zeta(\mu + \eta \sigma)$, where η controls the size of the population. For example, on a normal distribution, three standard deviations on both sides of the mean cover 99.7% of the population. Value ζ controls the width of the homogeneity function $W_\psi$. For instance, a higher value of ζ leads to larger g-scale regions, given that two adjacent voxels with larger intensity difference may be considered to be locally homogeneous and belong to the same g-scale region.

Figure 4B:
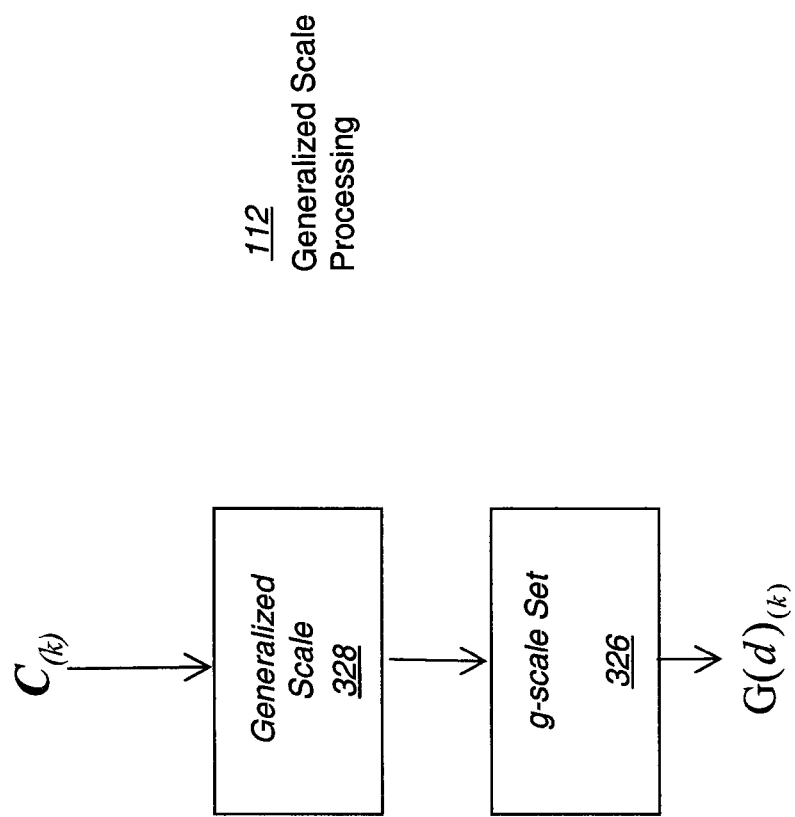
FIG. 4B is a logic flow diagram showing homogeneity estimation.

The logic flow diagram of FIG. 4B shows how g-scale process 112 of FIG. 1 works according to one embodiment. In a generalized scale step 328, a given input scene $C_{(k)}$ is partitioned into regions, called a g-scale set 326. The g-scale regions collectively cover the entire scene domain and are non-overlapping; that is, any two g-scale regions are either the same region in C or they are completely disjoint. This implies that for any voxel d∈G(c), there is no need to compute G(d). The generalized scale (g-scale) at any image element p is considered to be the set of all image elements within the largest, homogeneous, fuzzily connected region containing p. Roughly speaking, the g-scale at p is the largest set (of any shape whatsoever) of elements within which there is a spatial contiguity of intensity homogeneity. As defined in the article by Madabhushi, A., Udupa, J. K., and Souza, A., entitled "Generalized scale: theory, algorithms, properties and application to image inhomogeneity correction," Comput. Vis. Image Und. 101, 100-121 (2006), for any number tg∈[0, 1], and a homogeneity function $W_\psi$, the g-scale G(c) of any c∈C in a given scene C=(C,f) is the largest subset of C such that:

1. G(c) contains c, and
2. for any adjacency of voxels in C, e.g., 6-adjacency, and for any d, o∈G(c), there exists a path $p_{do} = \langle c^{(1)} = d,$ $c^{(2)}, \ldots, c^{(m)} = o$ in $G(c)$ connecting d to o such that, for $1 \le i \le m$, $W_\psi(|f(c(i))-f(c(i+1))|) \ge tg$.

Generally, $W_\psi$ should satisfy the following properties:
(P1) function range should be [0, 1], $W_\psi(0)=1$, and
(P2) for any c, d∈C, $W_\psi$ should be monotonically non-increasing with $|f(c)-f(d)|$.

In one embodiment of the present invention, a zero-mean un-normalized Gaussian function with standard deviation $\sigma_\psi$ is used for $W_\psi$.

Embodiments of the present invention provide a novel semi-locally adaptive scale, called an s-scale, for improved g-scale formation. Basically, for any voxel e, such that $|G(d)| \ne |G(e)|$, if $|G(d)| \ge |G(e)|$ and $W_\psi(|f(d)-f(e)|) \ge tg$, then e∈G (d). Note that that when tg is set to 1, the diffusion process is driven toward its limiting case, i.e., a sliding mode, as described previously.

Figure 5:
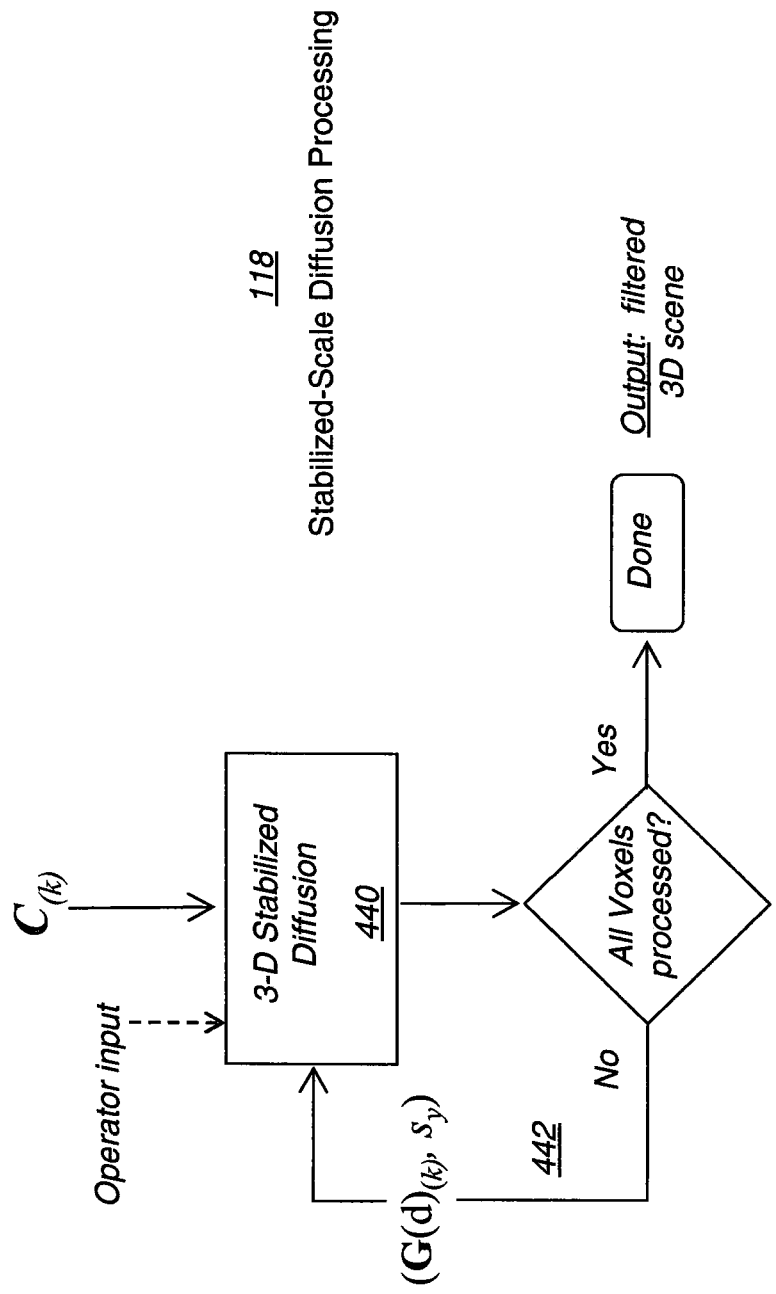
FIG. 5 is a logic flow diagram showing stabilized-scale diffusion processing.

The logic flow diagram of FIG. 5 shows how a stabilized-scale diffusion process 118 works for a 3-D image according to one embodiment. In this process, a current scene $C_{(k)}$ is filtered in stabilized diffusion step 440 by a 3-D stabilized diffusion process, described subsequently, that is locally controlled by the pair $(G(d)_{(k)}, \sigma_\psi)$. This is performed as a process loop 442 iterates over all voxels d∈C. The output of process 118 is a filtered 3-D scene for display or analysis. An optional set of parameters can be entered according to operator input instructions, such as a parameter that relates to image scale, an estimated intensity homogeneity value, a number of processing iterations, or a specific clinical task or tissue or bone type, for example.

Figure 6:
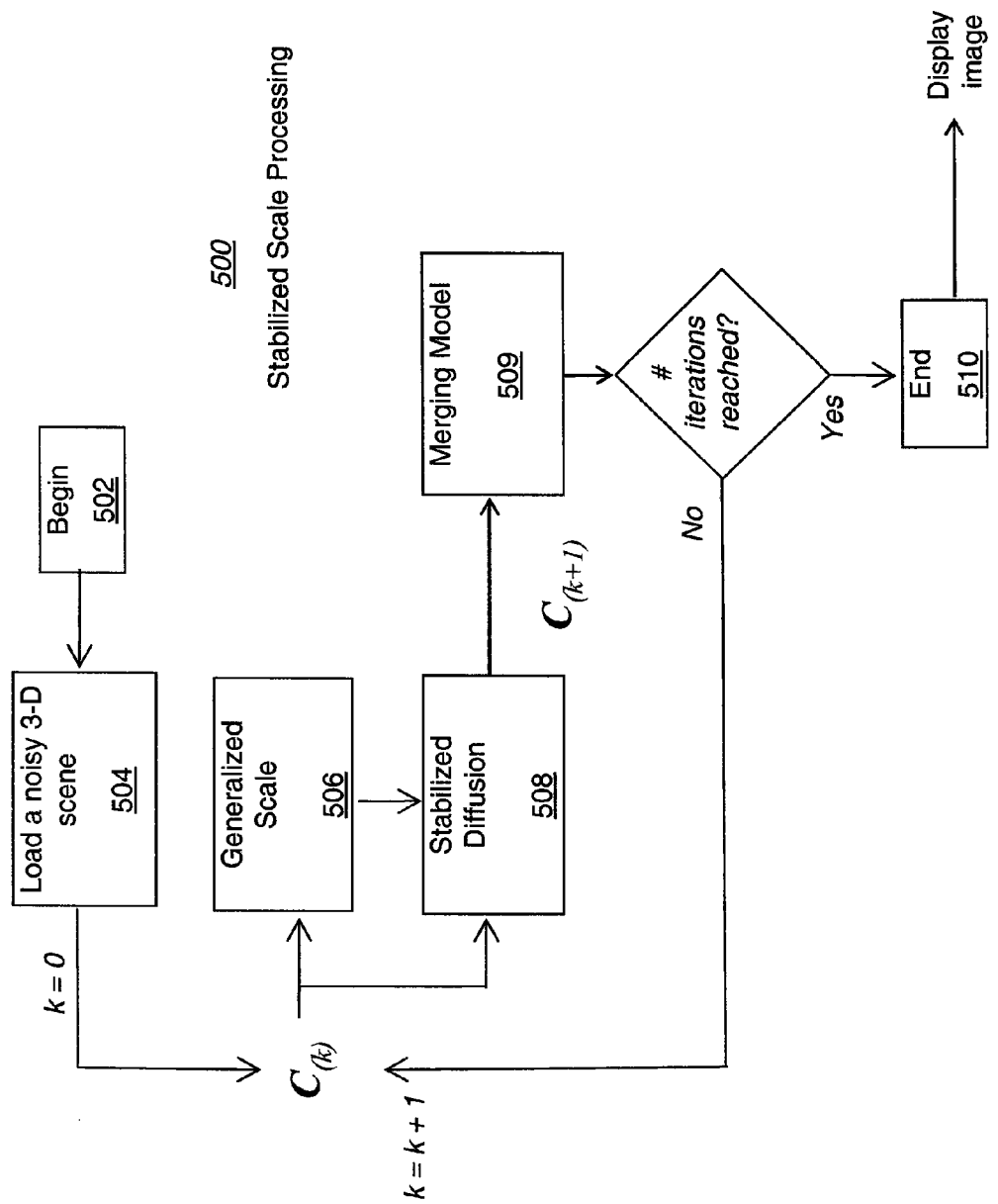
FIG. 6 is a logic flow diagram for the stabilized scale process according to one embodiment of the present invention.

Referring to FIG. 1, stabilized-scale diffusion process 118 is synergistically coupled with g-scale process 112. FIG. 6 shows an example flow diagram for a stabilized-scale diffusion process 500 consistent with an embodiment of the present invention, again shown for a 3-D image. This processing begins in an initialization step 502. A noisy 3-D scene coming from an imaging apparatus, for example but not limited to 3-D cone-beam CT imaging system, is loaded at a load step 504. This initial scene $C_{(k)}$ where k=0 (where k again denotes the iteration number) is then used as input to a g-scale step 506. The output of step 506 is a g-scale set scene $G(d)_{(k)}$. A stabilized diffusion process is carried out in a diffusion step 508.

The locally adaptive scale is used to adaptively control the flow of diffusion on $C_{(k)}$. The output of step 508 is a filtered scene $C_{(k+1)}$ which serves as a new input for steps 506 and 508 upon subsequent iterations. As described earlier, this process repeats iteratively a predetermined number of times, or when image data characteristics appear to meet predetermined requirements. A merging model step 509 is placed on the iterative loop as described earlier, ending at a finalization step 510 and providing the filtered 3-D scene as output, such as on a display screen, for example.

Stabilized Diffusion Filtering

The diffusion flow magnitude function |V| has its maximum value at magnitude gradient $|F|=\sigma_\psi$. |V| is monotonically increasing for $|F|<\sigma_\psi$ and monotonically decreasing for $|F|>\sigma_\psi$. The diffusion conductance function for the flow from c to d at the tth (kth) iteration is given by:

$$G_{(k)}(c,d) = e^{-\frac{|F_{(k)}(c,d)|^2}{2\sigma_\psi^2}} \quad (8)$$

$$F_k(c,d) = \{f_k(c)-f_k(d)\}D(c,d) \quad (9)$$

where, for any 6-adjacent voxels c,d∈C such that c≠d, then D(c,d) is the unit vector along the direction from voxel c toward voxel d. $F_{(k)}(c,d)$ is the component of the intensity gradient vector along D(c,d). Intensity flow vector $V_{(k)}(c,d)$ from voxel c to voxel d at the kth iteration is defined by:

$$V_{(k)}(c,d) = G_{(k)}(c,d)F_{(k)}(c,d) \quad (10)$$

Iterative processing is then defined as follows:

$$f_{(k)}(c) = \begin{cases} f(c) & \text{for } k=0 \\ f_{k-1}(c) - k_s \sum_{d \in C} V_{k-1}(c,d) \cdot D(c,d) & \text{for } k>0 \end{cases} \quad (11)$$

where $k_s$ is a time step constant for the diffusion process. Value $k_s$ is non-negative and has an upper bound limit that depends on adjacency criterion in order to keep the process stable. In one embodiment, the value $k_s=1/7$ is used.

The flow direction between any two voxels c, d∈C is always such that this process tries to reduce the gradient between them. That is: $V_k(c,d) \cdot D(c,d)$ is positive when $f_k(c) > f_k(d)$, and negative otherwise, and zero when c=d. Further, this diffusion process as described with respect to equations (8) through (11) is both nonlinear and anisotropic.

A stabilized diffusion process encourages diffusion flow along fuzzy boundaries, rather than across them. For this type of diffusion, iterative processing is then modified as follows:

$$f_{(k)}(c) = \quad (12)$$
$$\begin{cases} f(c) & \text{for } k=0 \\ f_{k-1}(c) - \frac{k_s}{\sum_{d \in C}|G(d)|} \sum_{d \in C}|G(d)|V_{k-1}(c,d) \cdot D(c,d) & \text{for } k>0 \end{cases}$$

Task-Based Filtering

Figure 7A:
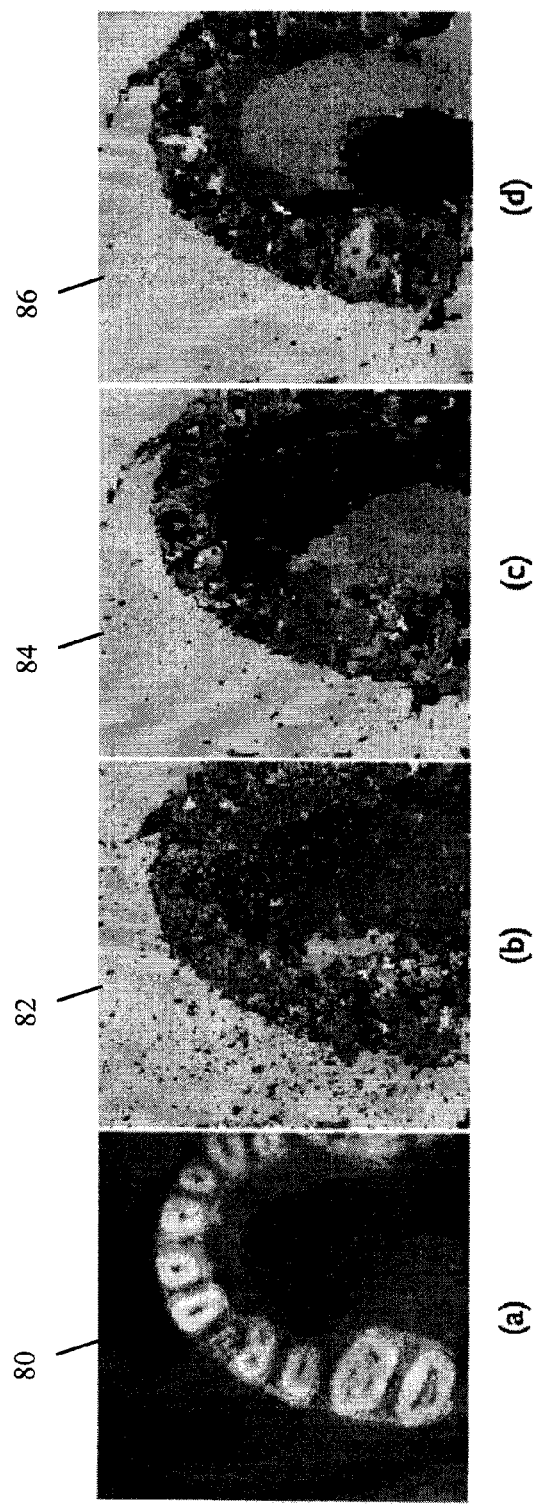
FIG. 7A is a plan view showing different scale processing and parameters applied to an image.

Embodiments of the present invention enable s-scale diffusion over a range of possible scale values. This makes it possible, for example, to adjust the diffusion processing appropriately for features of interest to the viewer. By way of example, FIG. 7A shows an original scene from a CT image 80 and image rendering of scene G(d) under different scale conditions. Note that basically three parameters are adjusted in these examples. A first parameter is for the intensity homogeneity value threshold tg. Two additional parameters t1 and t2 set the number of iterations for the s-scale set formation; t1 for larger s-scale set formation and t2 for finer set formation. An image 82 shows the g-scale scene with tg=0.80. An image 84 shows results for an s-scale scene with tg=0.80 and t1=t2=1. An image 86 shows results for an s-scale scene with tg=0.80 and t1=60, t2=1.

Figure 7B:
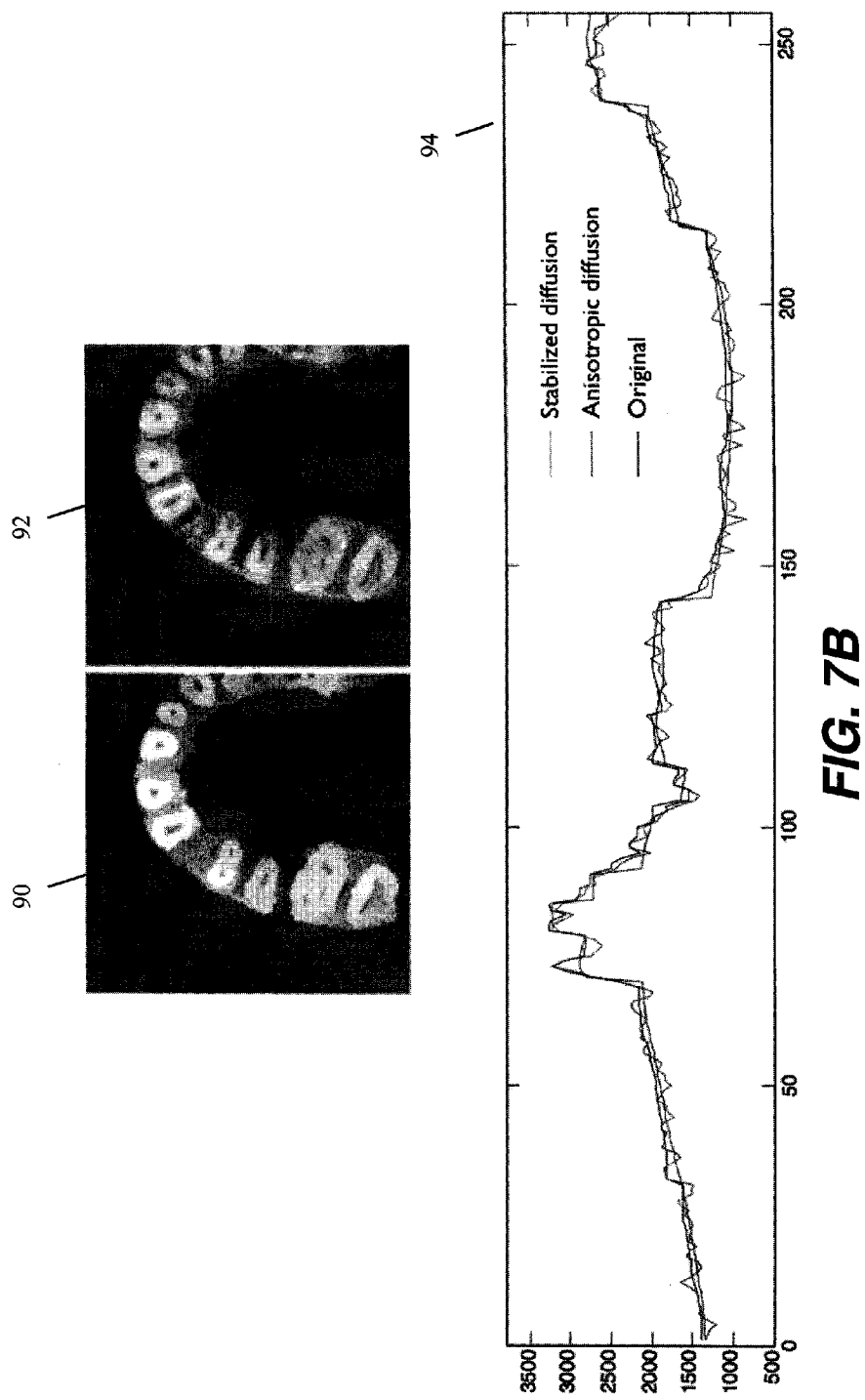
FIG. 7B is a plan view that shows results using different types of diffusion filtering.

FIG. 7B shows diffusion filtered scenes of image 80, after a long diffusion time, i.e. after several iterations. Image 90 is the result of Perona and Malik's anisotropic diffusion process and image 92 shows the stabilized-scale diffusion process used in embodiments of the present invention. A plot showing intensity profiles from both of these diffusion processes is given in a graph 94.

Figure 8:
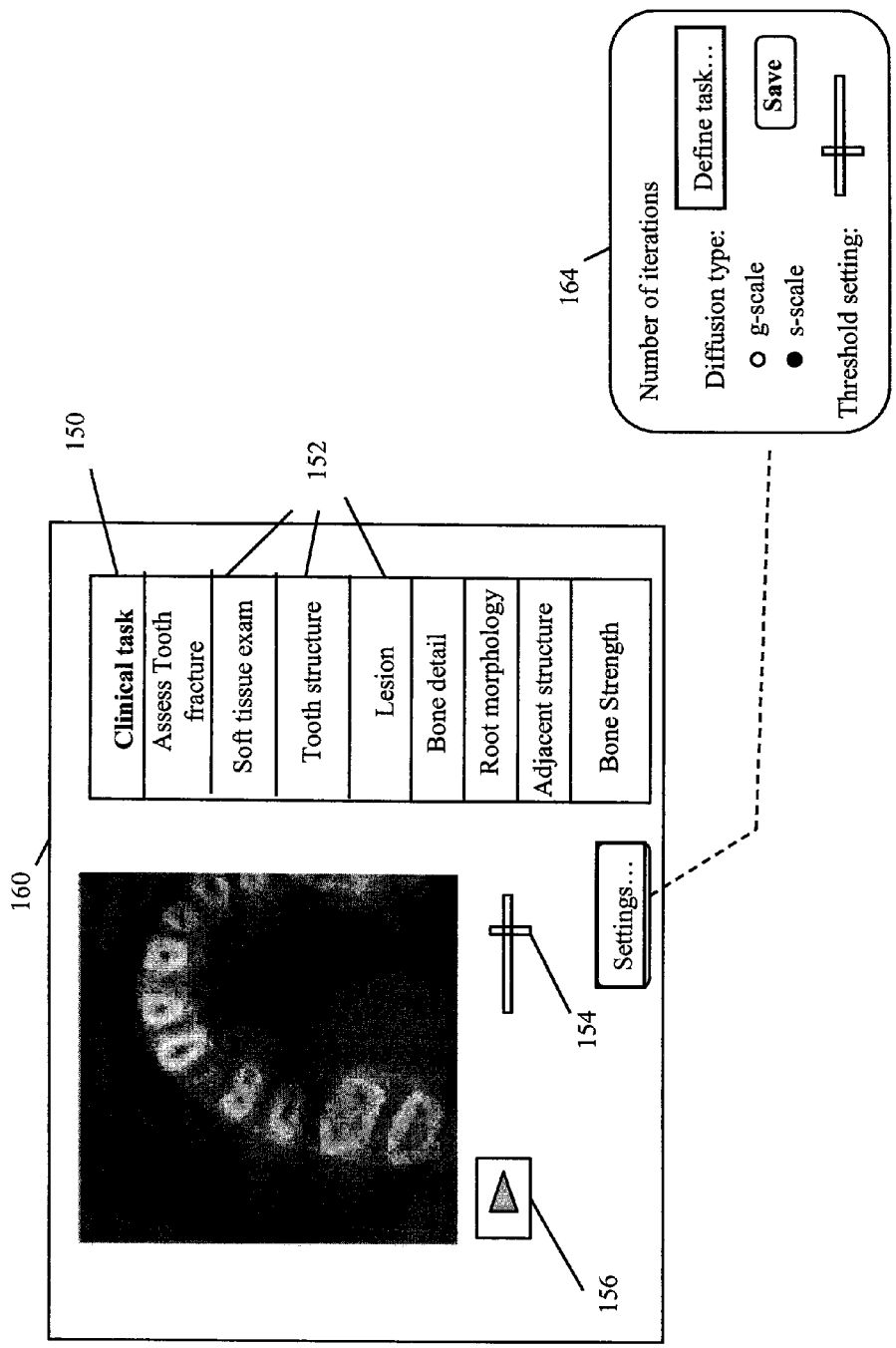
FIG. 8 is a plan view of a user interface for specifying and modifying diffusion processing provided for a volume image.

The plan view of FIG. 8 shows an operator interface on a display screen 160 for selection of a scale value for diffusion processing according to one embodiment of the present invention. A pull-down menu 150 enables viewer selection of noise filtering treatment, according to how the image will be used by that viewer. Scale selections range from 2 or more times voxel size to sub-voxel resolution. Menu entries 152 relate to the clinical task for which the image is to be used. Viewer selection of a scale entry then sends an instruction that sets appropriate variables. An optional slide bar 154 allows the viewer to change parameters dynamically and have results rendered according to the desired parameters. Consistent with an embodiment of the present invention, slide bar 154 adjusts the level of the intensity homogeneity value threshold tg. An optional control 156 is provided for operator control of number of iterations for s-scale formation. In one embodiment, control 156 allows the operator to cycle through a controlled number of iterations, stopping the noise processing when an appropriate level of detail is shown. It can be appreciated that other types of control elements can be provided to allow operator entry or control of different parameters that relate to noise suppression for the volume image, using control icon types and operation familiar to those skilled in the graphical user interface arts. An optional window 164 enables the operator to enter additional instructions for process settings and allows the operator to save a set of default or preferred settings, including saving a set of parameter settings as a defined clinical task.

Using an operator interface such as that shown in FIG. 8, for example, a dental practitioner can select variables for display that are most appropriate for the type of tissue, bone, or other feature that is of most interest. This selection then conditions the behavior of noise filtering algorithms, allowing appropriate levels of detail for different viewers. Consistent with one embodiment of the present invention, a single click of the mouse or other command entry mechanism enables display of the volume image with or without diffusion or other appropriate noise suppression and other image conditioning.

Consistent with an alternate embodiment of the present invention, one or more parameter settings are effectively hidden from the end-user, so that user instructions specify only the type of tissue that is of interest. As shown in FIG. 8, for example, a menu 150 selection of a specific bone or tissue type is all that is needed in such an embodiment. Each menu entry 152 has an associated set of parameters that is automatically used when the particular menu selection is made.

Figure 9:
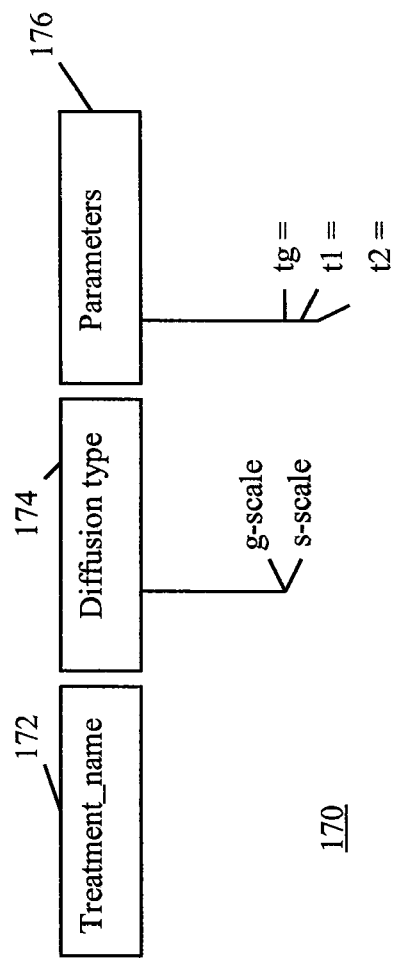
FIG. 9 is a diagram that shows a data structure for a menu selection in FIG. 8.

FIG. 9 shows a data structure 170 that is configured for providing a menu entry for viewer selection. A treatment name 172 is a text field for providing the menu entry 152 of FIG. 8. A diffusion type 174 specifies the diffusion type applied to the image for the assigned image treatment. A parameters entry 176 defines one or more parameters applicable for the diffusion type selected. Data structure 170 can be set up for the viewer or may be editable using a setup utility provided with the operator interface.

Figure 10:
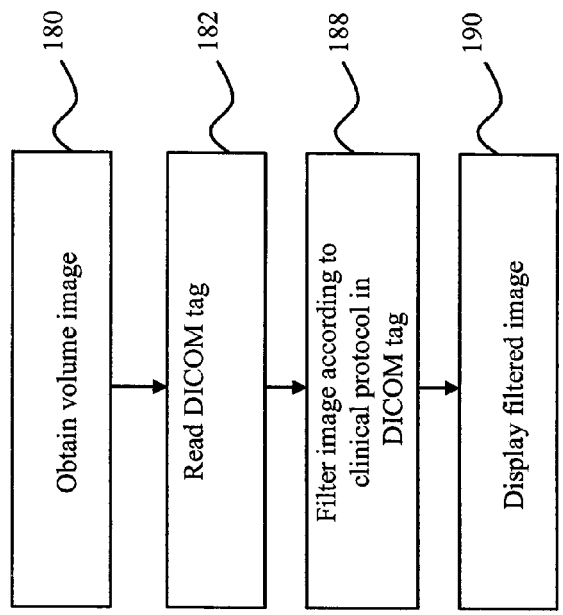
FIG. 10 is a logic flow diagram that shows a sequence of steps for implementing an image filtering protocol according to the DICOM tag.

The method of the present invention can be employed with newly acquired images and stored images from an image data storage system such as DICOM (Digital Imaging and Communications in Medicine) system. Embodiments of the present invention can take advantage of information available using the DICOM tag for applying an appropriate filter treatment to an image. Referring to the logic flow diagram of FIG. 10, there is shown a sequence of steps for implementing an image filtering protocol according to the DICOM tag. An obtain image step 180 accesses DICOM storage and obtains the volume image data. A read DICOM tag step 182 reads DICOM metadata, which can include a tag that identifies a clinical task of interest. A filter step 188 then applies a suitable processing protocol to the volume image based on the clinical task of interest that has been identified. A display step 190 then displays the filtered image. Optionally, display step 190 also shows the volume image without filtering treatment, such as the image data originally captured, for example. This allows the viewer to assess the appropriate use of filtering and other image conditioning processes on the volume image data.

The method of the present invention has been described primarily as it relates to cone-beam x-ray image processing for teeth and related structures; however, this method can also be used for other types of imaging where 3-D reconstruction techniques are employed.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as magnetic media, CD-ROMs, hard drives, or any other machine-readable storage medium, wherein, when the program code is loaded into and executed by a logic processor, such as a computer or image processing workstation, the logic processor becomes an apparatus for practicing the invention.

The method of the present invention can be executed automatically and its results stored electronically and displayed on a display terminal without operator intervention. Alternately, the operator can enter information or values that condition the performance of an automated algorithm. For example, a homogeneity value for g- or s-scale may alternately be entered or adjusted by an operator in order to affect the performance of diffusive filtering. In one embodiment, the operator interface is a touchscreen with a slider icon for entry of an adjustment instruction from the operator.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for noise suppression in a 3-D volume image, executed at least in part on a logic processor, comprising:
   obtaining the 3-D volume image;
   applying diffusion with semi-locally adaptive scale to the 3-D volume image according to a parameter that relates to image scale and is specified in an operator instruction; and
   displaying, storing, or transmitting the 3-D volume image modified according to the applied diffusion.

2. The method of claim 1 wherein the parameter that is specified in the operator instruction further relates to an estimated intensity homogeneity value.

3. The method of claim 1 wherein the parameter that is specified in the operator instruction further relates to a number of iterations for applying at least a portion of the diffusion processing.

4. The method of claim 1 wherein the parameter that is specified in the operator instruction relates to a clinical task.

5. The method of claim 1 wherein the parameter that is specified in the operator instruction further relates to one or more tissue or bone features of interest.

6. The method of claim 1 wherein applying diffusion to the volume image comprises applying diffusion at a variable scale.

7. The method of claim 1 further comprising simultaneously adjacently displaying the volume image with diffusion and the volume image without diffusion.

8. The method of claim 1 wherein applying diffusion further comprises merging results obtained from successive iterations.

9. A method for processing a 3-D medical image, comprising:
   obtaining the 3-D medical image;
   processing the obtained 3-D image by applying a stabilized diffusion process with semi-locally adaptive scale using a succession of different scale values and merging results obtained using the different scale values; and
   displaying, storing, or transmitting the processed 3-D image at one or more of the succession of scale values.

10. The method of claim 9 wherein the different scale values are determined according to homogeneity within the image.

11. The method of claim 9 wherein obtaining the 3-D medical image comprises obtaining the image from an image data storage system and wherein data stored with the obtained image identifies a clinical task for the medical image and wherein the step of applying diffusion is carried out according to the identified clinical task.

12. A method for noise suppression in a 3-D volume image, comprising:
   obtaining and displaying the 3-D volume image;
   accepting an operator-supplied instruction for processing the 3-D volume image, wherein the operator instruction relates to an image scale;
   applying a noise-resistant stabilized diffusion filtering with semi-locally adaptive scale to the volume image according to the image scale from the operator-supplied instruction; and
   displaying, storing, or transmitting the 3-D volume image modified according to the applied stabilized diffusion.

13. The method of claim 12 wherein accepting the operator-supplied instruction includes:
   displaying a plurality of clinical tasks; and
   allowing the operator to select one of the displayed plurality of clinical tasks.

14. A method for noise suppression in a 3-D volume image, comprising:
   obtaining the 3-D volume image;
   generating a diffused 3-D volume image by automatically applying diffusion filtering with semi-locally adaptive scale according to a parameter specified in an operator-supplied instruction, the parameter being related to (a) a clinical task or (b) a tissue or bone feature of interest; and
   displaying, storing, or transmitting the diffused 3-D volume image.

15. The method of claim 14, further comprising providing a control element which allows for dynamic selection of the parameter by the operator.

16. The method of claim 15, wherein the control element is a slider bar.

17. The method of claim 14, further comprising providing a control element which allows for dynamic selection of a parameter which relates to a number of iterations for applying at least a portion of the diffusion filtering.

18. The method of claim 1 wherein the parameter is specified by displaying a plurality of clinical tasks and an operator selecting one or more of the plurality of clinical tasks.

19. The method of claim 1 wherein the image is a dental image, and the operator instruction relates to one of the following: tooth fracture, tissue exam, tooth structure, lesion, bone detail, root morphology, or bone strength.

* * * * *